United States Patent
Gaziz

(10) Patent No.: US 7,139,716 B1
(45) Date of Patent: Nov. 21, 2006

(54) ELECTRONIC AUTOMATION SYSTEM

(76) Inventor: Neil Gaziz, 172-04 32nd Ave., Flushing, NY (US) 11358

( * ) Notice: Subject to any disclaimer, the term of this patent is extended or adjusted under 35 U.S.C. 154(b) by 886 days.

(21) Appl. No.: 10/215,817

(22) Filed: Aug. 9, 2002

(51) Int. Cl.
*G10L 21/00* (2006.01)

(52) U.S. Cl. .................. 704/275; 704/270; 704/231; 704/272

(58) Field of Classification Search ............ 704/275, 704/270, 231, 232
See application file for complete search history.

(56) References Cited

U.S. PATENT DOCUMENTS

| | | | |
|---|---|---|---|
| 5,086,385 A * | 2/1992 | Launey et al. ............ 700/83 |
| 5,109,222 A * | 4/1992 | Welty ................... 340/825.72 |
| 6,580,950 B1 * | 6/2003 | Johnson et al. ........... 700/17 |
| 6,606,280 B1 * | 8/2003 | Knittel .................... 367/198 |
| 6,654,720 B1 * | 11/2003 | Graham et al. ............ 704/270 |
| 6,735,619 B1 * | 5/2004 | Sawada .................... 709/212 |
| 2003/0105637 A1 * | 6/2003 | Rodriguez et al. ........ 704/270 |

* cited by examiner

*Primary Examiner*—Richemond Dorvil
*Assistant Examiner*—Qi Han
(74) *Attorney, Agent, or Firm*—Goldstein Law Offices P.C.

(57) ABSTRACT

A home automation system, for controlling a plurality of uniquely identifiable appliances within a dwelling having several rooms, each room designated as a zone, using a zone controller located within each room. Each appliance has a designated zone according to the room it is located within. Each zone controller is capable of receiving user customizable voice commands. When each voice command is received by one of the zone controllers associated with one of the appliances, a command is transmitted by that zone controller to the associated appliance if within the zone. If the appliance is within another of the designated zones, the zone controller receiving the voice command transmits a command to the zone controller having the same zone designation as that appliance, which in turn transmits the command to the appliance.

6 Claims, 4 Drawing Sheets

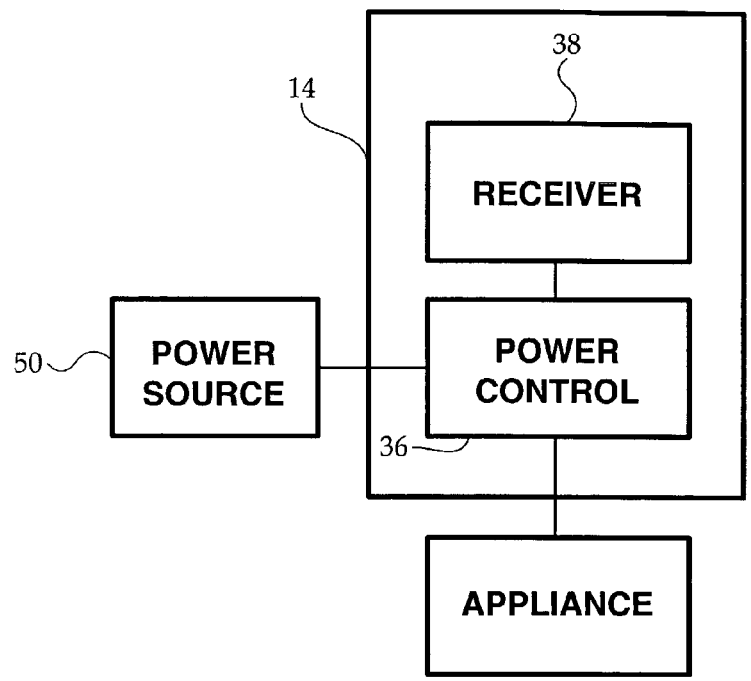
Fig. 5
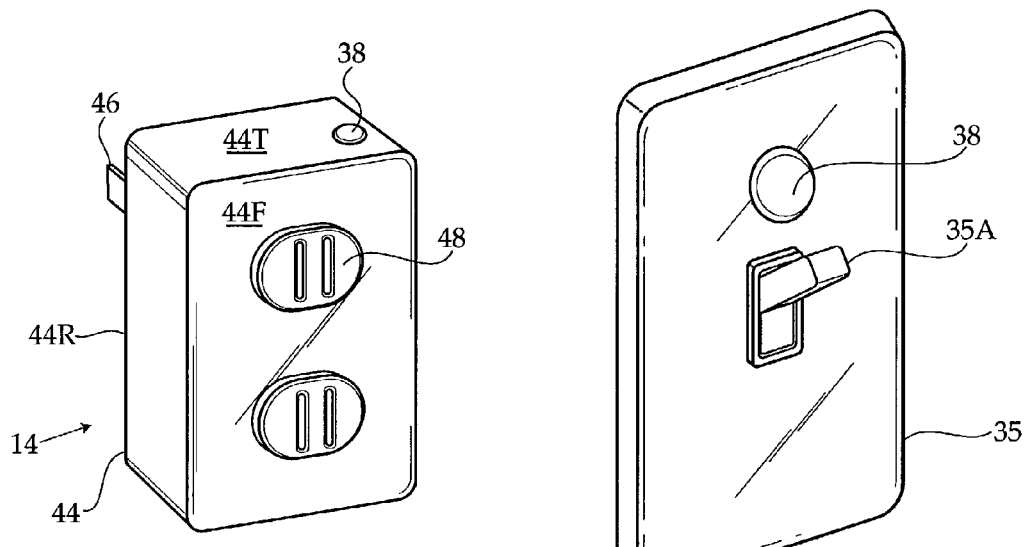
Fig. 6
Fig. 7

ELECTRONIC AUTOMATION SYSTEM

BACKGROUND OF THE INVENTION

The invention relates to an electronic automation system. In particular, the invention is an electronic automation system having a master unit and a plurality of working units each connected to a light switch or electrical outlet. The master unit is programmable to retain inputted information, and sends signals to the working units according to the user's instructions.

New technology can make tasks easier and more convenient. In addition, control system technology promises to allow us to manage our technology effectively. Where automation has allowed most manufacturing and business processes to be performed as desired with minimal human interaction, comprehensive home automation has been slow to develop. Voice recognition systems enable people to operate individual electronic devices, such as appliances and telephones, simply by speaking commands into the device. However, the ability to universally control a large variety of devices with a single integrated system would be highly desirable—especially in the home.

While these units may be suitable for the particular purpose employed, or for general use, they would not be as suitable for the purposes of the present invention as disclosed hereafter.

SUMMARY OF THE INVENTION

In view of the foregoing disadvantages inherent in the prior art, the present invention provides an improved home automation system. As such, the general purpose of the present invention, which will be described subsequently in greater detail, is to provide a new and improved home automation system which has all the advantages of the prior art and none of the disadvantages.

It is an object of the invention to provide a home automation system connected to various electrical appliances and fixtures to be controlled. Accordingly, the home automation system includes a controller which is capable of receiving commands and communicating with a plurality of appliances in response to the commands received.

It is another object of the invention to allow voice control of the various appliances. Accordingly, the controller has voice recognition capabilities so that it can correctly identify from an oral command which appliance is to be controlled and what commands are to be communicated to that appliance.

It is a further object of the invention to provide a system which is capable of controlling all of the appliances within a room. Accordingly, a ceiling mounted zone controller is employed which is capable of learning IR commands associated with particular appliances and transmitting both RF and infrared commands to the various appliances within the room.

It is a still further object of the invention to provide a system which is capable of controlling all of the appliances within a dwelling. Accordingly, each ceiling zone mounted controller may be employed in each room, known as a zone. When a voice command for an appliance in another zone is received by one of the controllers, it is transmitted to another zone controller in the same zone as that appliance. That zone controller transmits the desired command to the appliance.

It is yet a further object of the invention that the system is expandable. Accordingly, a home computer can be integrated with the system for configuring the various components thereof, and for allowing external control of the various devices via modem or Internet. Further, sensors may be employed to facilitate automated control of the various appliances when suitable conditions are detected by the sensors.

The invention is a home automation system, for controlling a plurality of uniquely identifiable appliances within a dwelling having several rooms, each room designated as a zone, using a zone controller located within each room. Each appliance has a designated zone according to the room it is located within. Each zone controller is capable of receiving user customizable voice commands. When each voice command is received by one of the zone controllers associated with one of the appliances, a command is transmitted by that zone controller to the associated appliance if within the zone. If the appliance is within another of the designated zones, the zone controller receiving the voice command transmits a command to the zone controller having the same zone designation as that appliance, which in turn transmits the command to the appliance.

To the accomplishment of the above and related objects the invention may be embodied in the form illustrated in the accompanying drawings. Attention is called to the fact, however, that the drawings are illustrative only. Variations are contemplated as being part of the invention, limited only by the scope of the claims.

BRIEF DESCRIPTION OF THE DRAWINGS

In the drawings, like elements are depicted by like reference numerals. The drawings are briefly described as follows.

FIG. 5 is a block diagram, illustrating an embodiment of the appliance control module according to the present invention, having a remote finder function.

FIG. 6 is a diagrammatic perspective view, illustrating the appliance control module.

FIG. 7 is a front elevational view, illustrating a replacement wall switch, according to the present invention.

REFERENCE NUMERALS

Figure 1:
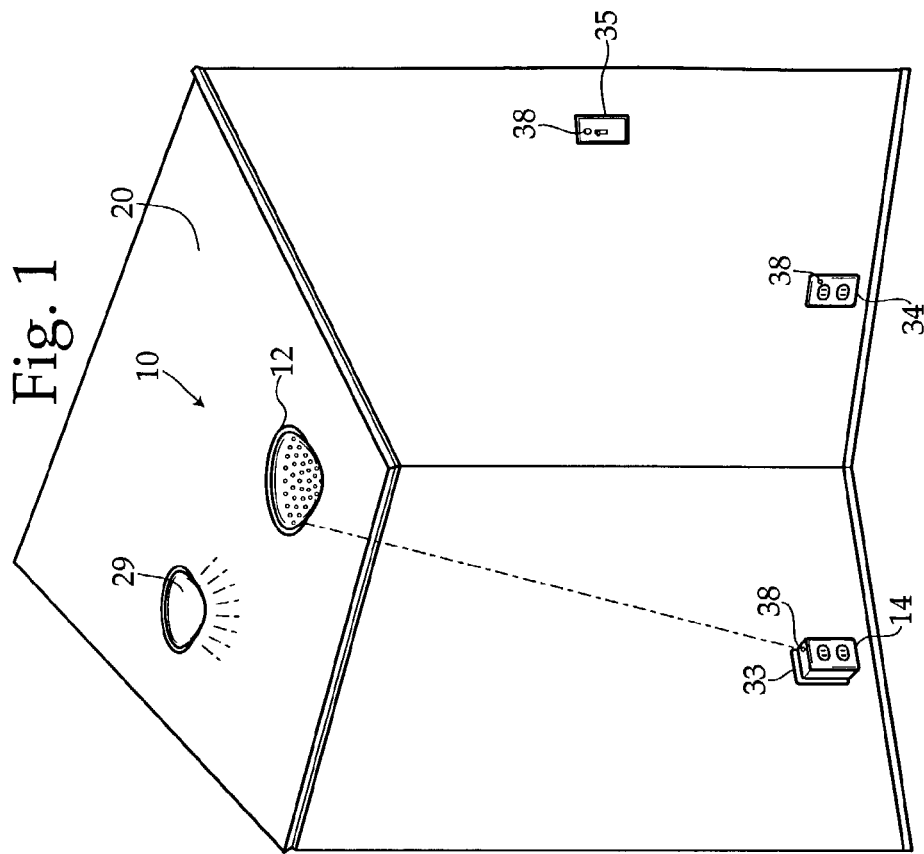
FIG. 1 is a diagrammatic perspective view, illustrating a room having the present invention incorporated therein.

10 electronic automation system
11 zone controller
11A other zone controllers
12 control unit
13 dome shaped housing
14 plug-in appliance module
14T module top surface
14F module front surface
20 room ceiling
24 microphone 26 command memory
28 command transmitter
29 light fixture
30 RF transmitter
32 RF receiver
33 controlled electric outlet
34 non-controlled wall outlet
35 wall mounted replacement switch
35A switch actuator
36 power control
38 infrared eye
44 slave unit box
44T box top surface
44F box front surface
44R box rear surface
46 prongs
48 controlled appliance module outlet
50 power source
54 infrared (IR) learning receiver
56 infrared (IR) transmitter
70 door frame
72 sensor

DETAILED DESCRIPTION OF THE PREFERRED EMBODIMENTS

FIG. 1 illustrates an electronic automation system 10 that is programmable to control lights and appliances in a home. As in a typical home, there are several rooms, each room may be designated as a separate zone. One such zone is illustrated in FIG. 1. The electronic automation system 10 essentially comprises a controller, and a plurality of appliances which are capable of being operated by the controller.

Every appliance within the system 10 must have a unique identity, which includes its zone location, such that each appliance for which control is desired must be individually addressable. Certain appliances are hardwired within the dwelling, such as a light fixture 29. According to the present invention, such appliances are controlled by replacement light switches 35. In addition, other "plug-in" appliances, such as lamps, which are controllable by simply controlling their power source, may be operated by a plug-in appliance module 14 or a controlled wall outlet 33. Further, appliances which require more precise control other than simply supplying or removing power from them, and which are generally operated by infrared commands from their own remotes, such as TVs, VCRs, stereos, etc., are operated directly from the controller by issuing such infrared commands directly to that appliance.

The plug-in appliance module 14 is illustrated in FIG. 5 and FIG. 6. In particular, the plug-in appliance module 14 has a front 14F having a controlled appliance module outlet 48 for attaching one of the appliances to be controlled and a top 14T having an infrared eye 38. The appliance module 14 further has prongs 46 which allow the appliance module 14 to be inserted into a non-controlled wall outlet 34, as illustrated in FIG. 1, for connection to a power source 50. Accordingly, a power controller 36 selectively provides power to the appliance module outlet 48 when proper commands are received by the infrared eye 38. Such commands may be on/off commands, or commands to modulate, vary the duty cycle, or otherwise condition the power supplied to the appliance module outlet 48, such as to effect "dimming" of a plug in light fixture.

In addition, the wall mounted replacement switches 35, as illustrated in FIG. 7, may replace an existing wall switch to allow the appliances controlled thereby to be operated by the system of the present invention. Typically, such wall switches are used to operate light fixtures 29. Accordingly, the wall mounted replacement switches 35 have a similar internal structure as the plug in module 14, as depicted in FIG. 5, with the exception that the outlets shown therein are replaced with hard-wired connections. In addition, the wall mounted replacement switches 35 have a manual actuator 35A so that they may be used like any other wall switch to manually control the appliance. The system may be selectively configured so that commands can override the manual actuator 35A or vice-versa.

In a similar regard, the controlled electrical outlets 33 are used to replace standard wall outlets, to streamline the appearance within the room, yet allow control of appliances plugged into such outlets 33. Accordingly, such controlled electrical outlets 33 have the infrared eye 38 for receiving commands, and are structured internally like the plug-in module as illustrated in FIG. 5, with connection to the power source 50 hard-wired.

The system 10 utilizes voice recognition technology of the type currently available and continuously being developed. Vocal commands are used to program and control the system. A control unit 12 is employed to process such commands and reference a command memory 26 so that it can take appropriate action according to each command recognized. Many commands will of course be contextual, and spoken in idiomatic language, requiring flexibility in determining how to properly process each command. Accordingly, the system is configured to learn from the user the type of commands which should be used. In addition, certain commands will vary from speaker to speaker. In particular "my" (TV, overhead light, etc.) can refer to a different appliance to different users residing within the same dwelling.

Figure 3:
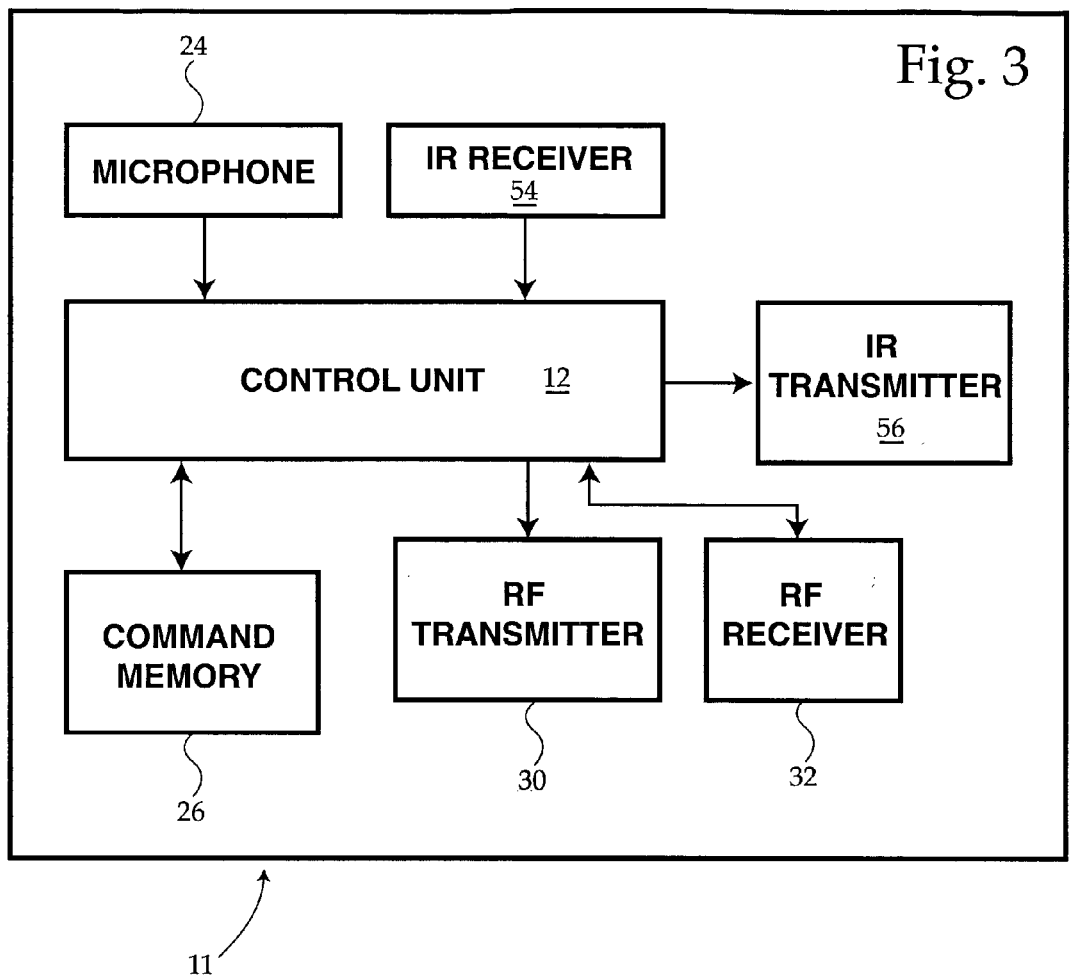
FIG. 3 is a block diagram of the major functional components of the ceiling mounted zone controller.

To facilitate effective use, at least one zone controller 11 is provided. As illustrated in FIG. 3, the zone controller 11 has a microphone 24 for receiving commands, and both an IR transmitter 56 and an RF transmitter 30 for transmitting the commands to the appliances. Accordingly, in simple terms, when voice commands are received by the microphone 24 they are processed by the controller 11 making reference to the command memory 26 and are sent to the appropriate appliance through one of the RF transmitter 30 and the IR transmitters 56.

The wall mounted replacement switch 35, the plug-in appliance module 14, and the controlled electric outlet 33 can be configured to receive IR commands, as illustrated, and RF commands as well.

However, most electronic appliances must be controlled directly with specialized IR commands generated by an OEM (original equipment manufacturer) remote controller. Such commands might be numerous for certain devices, such as a DVD player, stereo, etc. In addition, the infrared signals recognized by such devices vary, from manufacturer to manufacturer, and even model to model. Accordingly the controller 11 is configured to learn the IR commands necessary to control those appliances from the OEM remote. In this regard, the controller has an IR learning receiver 54 which is capable of detecting and recording IR signals, such that the controller will appropriately store them in the command memory 26. When programming the controller 11 to operate a particular controller, the OEM remote is oriented toward the IR receiver 54 associated with the controller 11, the user would speak a voice command desired to be associated with control of that appliance, and then the user would press the appropriate button(s) on the remote control to create an IR signal which would have the desired effect on the appliance. Accordingly, the controller 11 will record the IR command along with voice command in the command memory 26. When the microphone 24 and control unit 12, making reference to the command memory, detect that the user has once again uttered that voice command, the controller 11 will generate the appropriate IR command through the IR transmitter 56 to operate the appliance. Note, as defined herein, "OEM remote" can refer to a controller provided by the original manufacturer of the appliance, or a "universal remote" which has already been programmed to generate the same infrared signals as the remote provided by the original manufacturer of the appliance.

Figure 2:
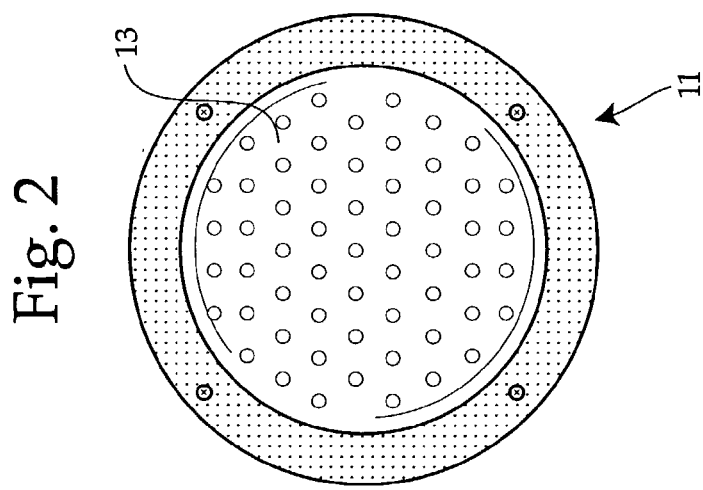
FIG. 2 is a bottom elevational view of a ceiling mounted zone controller according to the present invention.
Figure 4:
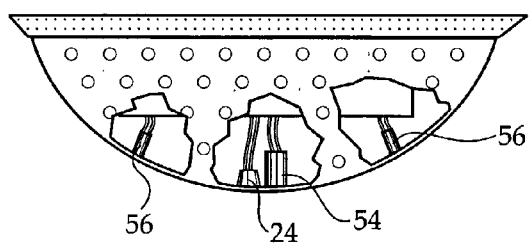
FIG. 4 is a side elevational view of the ceiling mounted zone controller, with the dome shaped housing broken away to illustrate internal components thereof.

FIGS. 1, 2, and 4 illustrate a preferred embodiment for the invention, wherein the controller 11 is a ceiling mounted controller, and has a dome shaped housing 13. As seen in FIG. 4, several IR transmitters 56 may be positioned along the dome 13, and the controller 11 is mounted to a room ceiling 20 so as to have the greatest coverage of the room. Further, the microphone 24 is centrally placed, and is preferably omni-directional, so as to be most sensitive to voice commands uttered within the room.

The IR learning receiver 54 is preferably placed "dead center" at the lowest point of the dome shaped housing 13, and oriented directly downward. Accordingly, when programming the unit, the OEM remote would be aimed directly upward at the housing 13 so that in most cases, the controller can be programmed without inadvertently activating the appliance by the OEM remote. Similarly, the IR learning receiver 54 is preferably narrowly focused in a substantially vertical sensitivity pattern, so that it will tend to only detect signals oriented directly upwards at the dome 13. Such an arrangement will help prevent the controller 11 from mistakenly being programmed when an infrared remote is in operation and the proper voice commands to initiate "learned programming" are coincidentally uttered.

Figure 8:
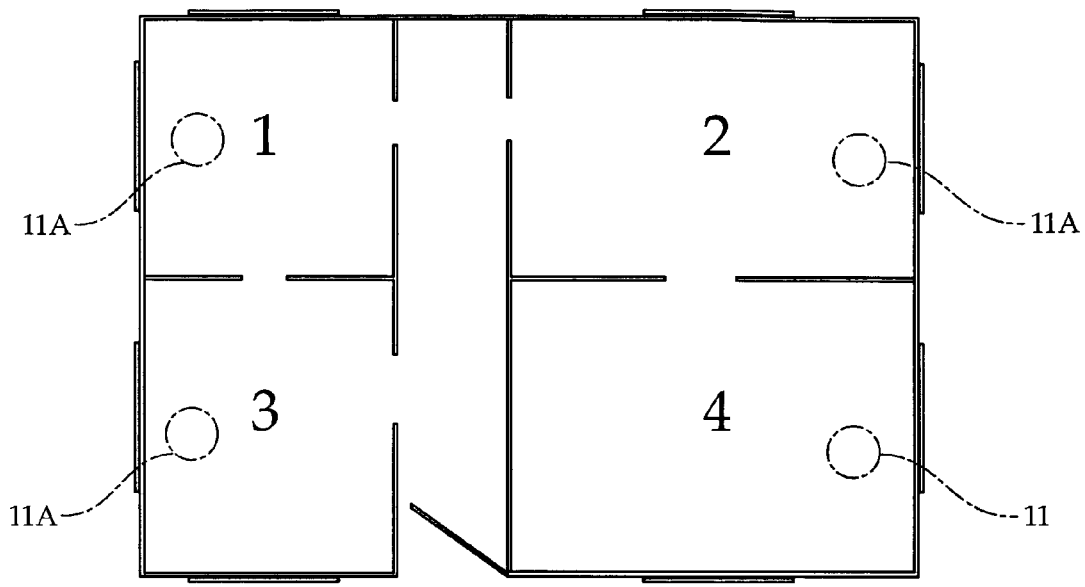
FIG. 8 is a diagrammatic perspective view, illustrating a system according to the present invention, where ceiling mounted zone controllers are located in different rooms, defining different zones.

Further preferred according to the present invention, as illustrated in FIG. 8, different rooms are designated as zones, and thus have their own zone controller 11. Each zone controller 11 preferably mounted on the ceiling 20 of each room where it can most effectively control the appliances in that room.

Further according to the present invention, the zone controllers 11 communicate with each other using their RF transmitters 30 and receivers 32. Accordingly, each zone has a unique identity, and each zone controller 11 responds to that unique identity. Thus, when voice commands are received by a zone controller 11 in one room, which are associated with one of appliances located within the zone associated with the zone controllers in another room 11A, the zone controller receiving the voice command will transmit to the other controller the unique identity of that appliance and the command uttered. In response, the zone controller in the room having that appliance will transmit the appropriate command to operate that appliance. Such allows the system to be completely modular, yet easily integrate all controllable appliances within a dwelling, so that they may be controlled from any room having one of the zone controllers.

In order to accomplish such contextual control, the system must learn voice commands which designate a zone, according to the preferences of the user. Accordingly, such zone designating commands may be "den", "living room", "kitchen", "My room", "Bob's room", etc, and can vary by the speaker. However, such zone designating commands are necessary to ensure that the proper zone controller 11 is employed to issue the desired command. With regard to the contextual flexibility required by the system, the system must recognize that a voice command such as "turn off the lights", would mean that the lights should be turned off in the room in which it is uttered.

Further, it is preferable that the system have a "name", so that the control unit 12 can distinguish words uttered during ordinary conversation from intended commands. Accordingly, a preferred syntax for commands is: system name, command, zone designation. Such would seem backwards, however it is more natural to speak "lower lights in family room" than to speak "family room lower lights".

When initially programming the electronic automation system 10, the system 10 would be assigned its system name, for example "Digital Butler". Then, each light fixture may be given an individual name, or grouped with other light fixtures. As each appliance module 14, wall mounted replacement switch 35, and controlled wall outlet 34 is individually addressable with a unique identity, however such identities may be relatively meaningless for everyday use, such as "B1", "243", "42AF", etc. Accordingly, such identities should be replaced with a meaningful voice command, such as "table lamp", "overhead light", etc. Next, the lighting levels can be set using the voice commands such that each level is assigned a unique command. By way of example, a low lighting level of eighteen (18%) percent is given the command of "Mood Lighting" and a high lighting level of one hundred (100%) percent is given the command of "Full Blast". There is no limit to the number of levels that may be programmed nor the creativity in naming the commands by the users. Telemetry between the zone controllers can allow communication and distribution of the data in command memory 26, as required to allow each zone controller 11 to properly recognize and distribute commands to the other zone controllers.

The zone controllers 11 can derive their power through hard wiring, or can be battery operated. With the low level signals being generated, the system can operate for an extended period of time using batteries. Further powering options may include recharging internal batteries from ambient lighting within each room using photoelectric cells in each zone controller 11.

Figure 9:
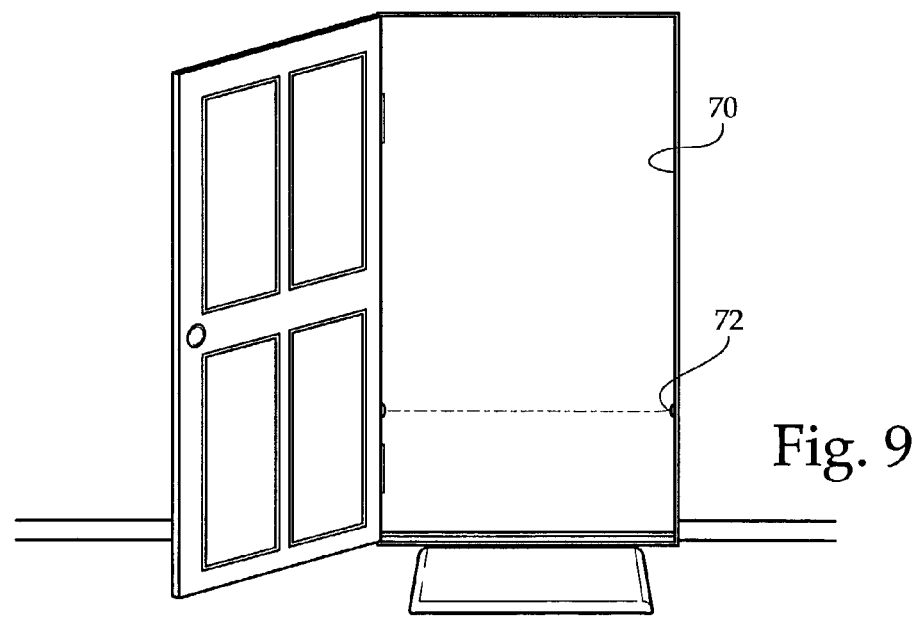
FIG. 9 is a perspective view illustrating a motion sensor located in a door frame.

In addition, numerous enhancements can be incorporated into the invention. For example, sensors in communication with any one of the controllers can be employed to detect various conditions within a dwelling, and respond accordingly. Thus, as illustrated in FIG. 9, a motion sensor 72 located in a door frame 70 can be used to operate lights and other appliances, according to preset criteria, as a person leaves and enters a room. Ambient light sensors can be used to automatically control lighting during different times of day. Temperature sensors can be used to operate controllable thermostats (in addition to allowing the user to operate climate control systems using voice commands). All that is necessary is to have one of the zone controllers be in communication with the sensor (generally by being within its "line of sight") in order for the system to operate any other device in response to data received from the sensor. Still further, a PC based module can be used to configure the system, including defining zones and naming appliances, more precisely than using voice commands alone. Such variations are contemplated as being a part of the present invention.

In conclusion, herein is presented an electronic automation system which allows all remotely controllable appliances within a dwelling to be operated from any room having a zone controller. The invention is illustrated by example in the drawing figures, and throughout the written description. It should be understood that numerous variations are possible, while adhering to the inventive concept. Such variations are contemplated as being a part of the present invention.

What is claimed is:

1. A home automation system, for controlling a plurality of appliances, each having a unique identity, a zone designation, and is capable of being controlled by an infrared command, within a dwelling having two or more rooms, each room having a ceiling and designated as a zone, each appliance located within one of the zones, comprising:

at least two zone controllers, each zone controller is contained within a dome shaped housing that has a lower surface and is ceiling mounted, each zone controller having a zone designation, a control unit, a microphone for receiving voice commands, a command memory for storing recognizable voice commands and associated appliance commands, an infrared transmitter and an RF transmitter, the infrared transmitter located a the lower surface, wherein each zone controller receives and responds to voice commands which identify one of the appliances, such that when the voice command received by the zone controller identifies one of the appliances located within the zone of that zone controller it responds by generating an infrared command to operate that appliance, and when the voice command received identifies one of the appliances having a different zone designation, the zone controller receiving the command generates an RF signal which is received by the zone controller having that different zone designation which responds by transmitting an infrared command to operate that appliance; and wherein at least one of the one controllers has an infrared learning receiver, such that said zone controller can repeat a distinct signal upon the utterance of a certain voice command in order to operate one of the appliances, after being programmed by receiving the distinct signal at the infrared learning receiver and substantially contemporaneously therewith receiving that certain voice command, wherein the infrared learning receiver is oriented directly downwardly from the housing with a narrow, vertical sensitivity pattern, to allow it to receive an infrared signal oriented directly upwardly at the dome shaped housing from immediately therebeneath and reject signals which are horizontally oriented.

2. The home automation system as recited in claim 1, wherein the system further comprises at least one of:

a replacement wall switch, hardwired to a power source and to one of the controllers, for selectively supplying power to that appliance, the replacement wall switch capable of receiving infrared commands for operating that appliance; and a controlled wall outlet, hardwired to a power source and to one of the controllers, for selectively supplying power to that appliance, the controlled wall outlet capable of receiving infrared commands for operating that appliance.

3. The home automation system as recited in claim 2, wherein the system further comprises a replacement wall switch, hardwired to a power source and to one of the controllers, for selectively supplying power to that appliances, the replacement wall switch capable of receiving infrared commands for operating that appliance, and the replacement wall switch having a manual actuator capable of manually controlling that appliance.

4. The home automation system as recited in claim 3, wherein the system is given a user assignable name, such that each voice command must be preceded by speaking the user assignable name in order for the zone controller to respond to the voice command.

5. The home automation system as recited in claim 4, wherein a voice command may be programmed by the user to represent the unique identity of any appliance addressable by the system.

6. The home automation system as recited in claim 5, wherein at least one sensor may be employed by the system, such that the system can operate at least one of the appliances in response to user determined criteria being detected and communicated by the sensor to one of the zone controllers.

* * * * *